(12) United States Patent
Kiest, Jr.

(10) Patent No.: US 10,295,104 B2
(45) Date of Patent: May 21, 2019

(54) PIPE LINER AND METHOD OF USING THE SAME

(71) Applicant: LMK Technologies, LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 384 days.

(21) Appl. No.: 15/334,436

(22) Filed: Oct. 26, 2016

(65) Prior Publication Data

US 2017/0045176 A1 Feb. 16, 2017

Related U.S. Application Data

(63) Continuation of application No. 13/348,481, filed on Jan. 11, 2012, now Pat. No. 9,494,271.

(51) Int. Cl.
| | |
|---|---|
| *B29C 63/00* | (2006.01) |
| *F16L 55/165* | (2006.01) |
| *B29C 63/36* | (2006.01) |
| *F16L 55/18* | (2006.01) |
| *B29L 23/00* | (2006.01) |

(52) U.S. Cl.
CPC .......... *F16L 55/1654* (2013.01); *B29C 63/36* (2013.01); *F16L 55/18* (2013.01); *B29L 2023/22* (2013.01)

(58) Field of Classification Search
CPC . B29C 63/00; B29C 63/0017; B29C 63/0021; B29C 63/0047; B29C 63/0073; B29C 63/18; B29C 63/182; B29C 63/22; B29C 63/26; B29C 63/28; B29C 63/30; B29C 63/34; B29C 63/341; B29C 2063/006; B29C 2063/348
See application file for complete search history.

(56) References Cited

U.S. PATENT DOCUMENTS

| | | | | |
|---|---|---|---|---|
| 4,976,290 | A * | 12/1990 | Gelin | F16L 55/1656 138/141 |
| 5,868,169 | A * | 2/1999 | Catallo | F16L 58/02 138/124 |
| 2009/0194183 | A1* | 8/2009 | Kiest, Jr. | B29C 63/28 138/98 |

\* cited by examiner

*Primary Examiner* — Jacob T Minskey
*Assistant Examiner* — Matthew Hoover
(74) *Attorney, Agent, or Firm* — Nyemaster Goode, PC

(57) ABSTRACT

A pipe liner and a method of using the same are provided. The method includes inserting a pipe liner impregnated with a resinous material into a length of pipe, where the pipe liner has an outer diameter substantially equal to or greater than an inner diameter of the pipe. A bladder having an unstretched outer diameter less than the inner diameter of at least a portion of the length of pipe and capable of stretching circumferentially is inserted into the pipe liner. The bladder is expanded under fluid pressure against the pipe liner, pressing the pipe liner against an inner wall of the length of pipe. The resinous material is allowed to cure and harden, leaving a renewed pipe wall. The length of pipe may have a plurality of inner diameters, and the bladder stretches to produce a smooth interior surface of the pipe liner across the plurality of pipe diameters.

18 Claims, 6 Drawing Sheets

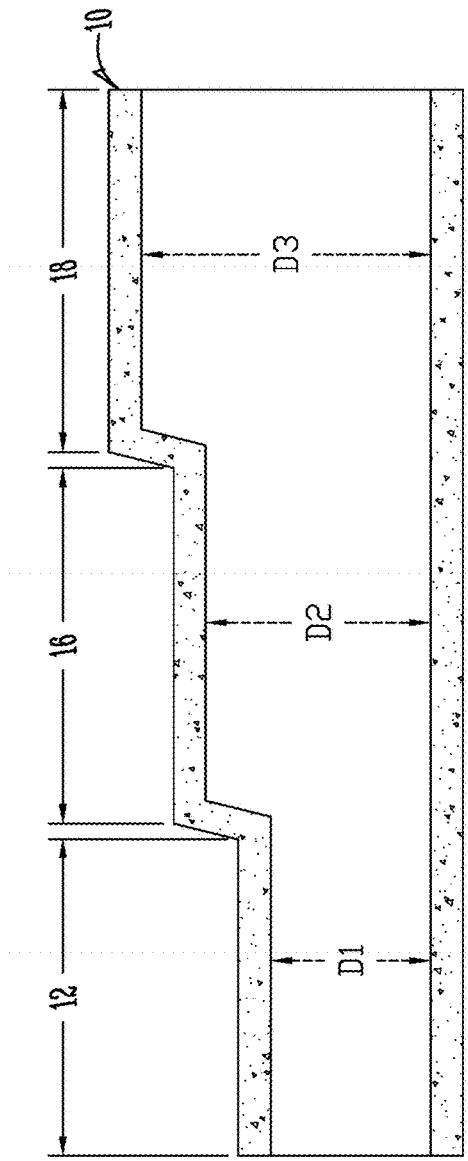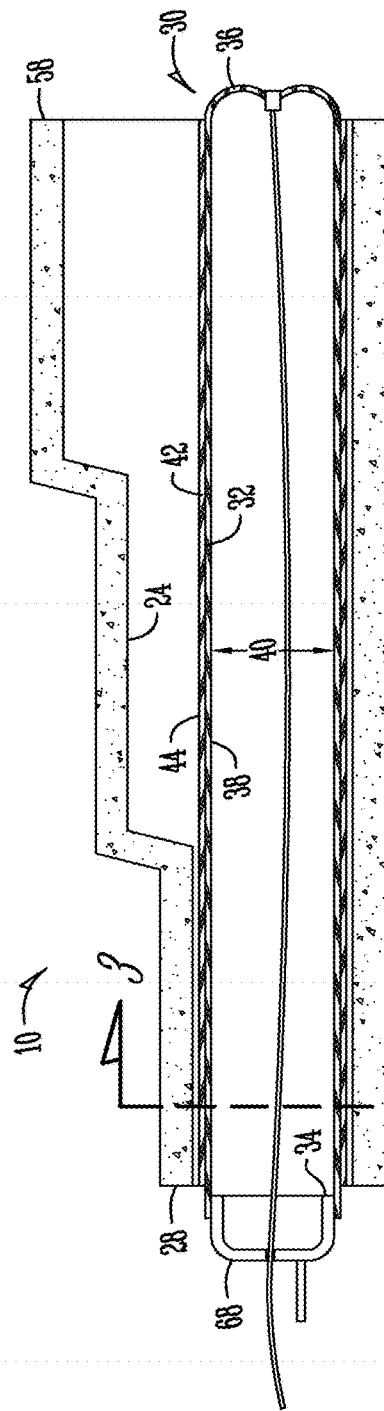

ID OF USING THE
PIPE LINER AND METHOD OF USING THE SAME

This is a continuation of U.S. patent application Ser. No. 13/348,481 filed on Jan. 11, 2012, the complete disclosure of which is hereby expressly incorporated by this reference.

FIELD OF THE INVENTION

The present invention generally relates to a method and means of repairing a pipe or other conduit. More particularly, but not exclusively, the invention relates to a method and assembly for lining the walls of a pipe or other conduit.

BACKGROUND OF THE INVENTION

As the infrastructure of the United States and the world continue to age and deteriorate, the need for solutions to infrastructure problems increases. One key infrastructure component that requires considerable rehabilitation or replacement is pipelines for transporting water, sewage, oil, and gas. Several problems persist regarding existing pipe infrastructure; including age, improper installation, decentralized planning of piping systems, inadequacy of rehabilitation techniques, and high cost of replacement.

One of the underlying problems with existing pipes, especially sewer pipes, is that many were made and installed long ago and oftentimes were assembled with pipes of varying diameters as new developments were incorporated into the system. Additionally, due to the old age of the pipes, as well as the materials used to make them, many pipes have begun to deteriorate, deform, or have damaged areas. The deformed or damaged areas create weak spots, which may allow water, roots, and dirt to infiltrate the sewer system and also lead to the eventual collapse of the pipe.

Methods exist for repairing the walls of pipes and other conduits. One such method involves the use of a cured-in-place (CIP) liner with a polymer coating on its interior surface and a bladder to repair the pipe wall. The liner is impregnated with a resin capable of curing and hardening. The liner and bladder are placed in the pipe, and the bladder is inflated to press the liner against the pipe wall. The resin is allowed to cure and harden, creating a new interior pipe wall. Since many liners include an interior polymer coating impervious to a resinous material, the liners usually cannot fold over themselves or bunch up because the liner wall would be formed with intermediate layers of material impervious to resin causing the liner to not be homogeneous across its thickness. The completed lining will be uneven and obtrusive within the pipe, disrupting pipe flow and allowing clogs to occur within the system.

One problem with existing methods of CIP lining is that the methods do not conform well to pipes with variable inner diameters. The common methods call for the use of a CIP liner and bladder having a diameter approximately equal to the diameter of the pipe. However, some pipes may include a plurality of diameters across their length due to decentralized planning of the sewer system or pipe deformation. There are two methods currently available to address this issue in CIP lining. The first includes lining the length of pipe in several segments, where a plurality of liners having diameters that match the pipe diameter are installed successively until the entire length of pipe has been lined. This method is extremely time-consuming in the field and may result in an uneven lining with the possibility for cold joints at the liner junctions. The second method commonly employed is tailoring a liner in a manufacturing facility to meet the exact dimensions of the length of pipe to be lined. This process is time-consuming and labor-intensive from a manufacturing perspective.

If an undersized liner were to be used to address such a problem, several problems would arise. It is conceivable that the use of a CIP liner having a diameter approximately equal to the smallest diameter of the pipe with the liner being capable of stretching circumferentially to press against the pipe wall so to prevent the liner from wrinkling could be a feasible option to repair a pipe length having a plurality of inner diameters. However, the process of using such pipe liners may require that the liner stretch considerably to repair the entire length of pipe. This can cause the liners to rip, tear or be too thin, leaving the pipe wall not fully repaired. Additionally, circumferential stretch of a fabric liner will usually result in loss of length. In such cases, it is uncertain whether the lining will cover the entire length of pipe to be repaired.

Accordingly, there is a need in the art for an improved method and means that overcomes the problems of obtrusions and irregular wall thickness in CIP pipelining applications. There is also a need in the art to provide an alternative to the time-consuming and labor-intensive process of producing pipe liners tailored to fit transitions in pipe diameter in a length of pipe.

BRIEF SUMMARY OF THE INVENTION

It is therefore a principal object, feature, or advantage of the present invention to provide an improved method and means for lining a pipe or conduit which improves over or solves the deficiencies in the art.

Another object, feature, or advantage of the present invention is to provide an improved method and means for lining a pipe wall that allows a liner to fold over itself and to bunch up while still producing a smooth interior wall.

Another object, feature, or advantage of the present invention is to provide an improved method and means for lining a pipe wall that sizes the outer diameter of the liner to substantially the largest inner diameter of the pipe.

Another object, feature, or advantage of the present invention is to provide an improved method and means for lining a pipe that uses a liner to transport a resinous material capable of curing and hardening into a pipe.

Another object, feature, or advantage of the present invention is to provide an improved method and means for lining a pipe that uses a bladder capable of stretching circumferentially to press the liner against the wall of the pipe.

Another object, feature, or advantage of the present invention is to provide an improved method and means for lining a pipe that uses a liner for containing a resinous material capable of curing and hardening. Another object, feature, or advantage of the present invention is to provide an improved method and means for lining a pipe where the pipe has varying diameters along the length of pipe to be lined.

These and/or other objects, features, and advantages of the present invention will be apparent to those skilled in the art. The present invention is not to be limited to or by these objects, features and advantages, and no single embodiment need exhibit every object, feature, and advantage.

According to one aspect of the present invention, a method of lining a length of pipe is provided. The method includes inserting a pipe liner impregnated with a resinous material into the length of pipe, where the pipe liner has an outer diameter substantially equal to or greater than an inner diameter of the length of pipe. A bladder capable of stretching circumferentially is inserted into the pipe liner, where the bladder has an unstretched outer diameter less than the inner diameter of at least a portion of the length of pipe. The bladder is expanded under fluid pressure against the pipe liner, pressing the pipe liner against an inner wall of the length of pipe. The resinous material is allowed to cure and harden, leaving a renewed pipe wall. The length of pipe may have a plurality of inner diameters.

According to another aspect of the present invention, a method of lining a pipe is provided. The method includes taking a pipe liner having a diameter substantially equal to the diameter of the pipe. The liner is impregnated with a resinous material capable of curing and hardening, and then positioned in the pipe. An inflatable bladder capable of stretching circumferentially is inserted into the liner. Next, the bladder is inflated to circumferentially stretch the bladder to press the pipe liner into contact with the wall of the pipe. The liner may be folded over itself or bunched along various portions of the pipe. The resinous material is allowed to cure and harden against a substantially smooth surface of the bladder, and then the bladder is optionally removed from the pipe.

According to yet another aspect of the present invention, a method of lining a pipe having varying diameters along its length is provided. The method includes taking a pipe liner having a tubular shape and an unstretched diameter substantially equal to a largest pipe diameter. The liner is impregnated with a resinous material capable of curing and hardening. Next, the liner is positioned in the pipe, followed by or simultaneously with the insertion of a bladder into the liner. The bladder is then expanded to press the liner against the wall of the pipe, with the liner folding on itself or bunching along portions of the pipe. The resinous material is allowed to cure and harden to produce a smooth finished surface, including along the portion of the liner folded on itself. Finally, the bladder is optionally removed from the pipe.

BRIEF DESCRIPTION OF THE DRAWINGS

FIG. 1 is a sectional view of an exemplary structure of a pipe having varying diameters across its length.

FIG. 2 is a sectional view of the liner assembly of the present invention positioned in a pipe.

DETAILED DESCRIPTION OF THE PREFERRED EMBODIMENTS

Figure 3:
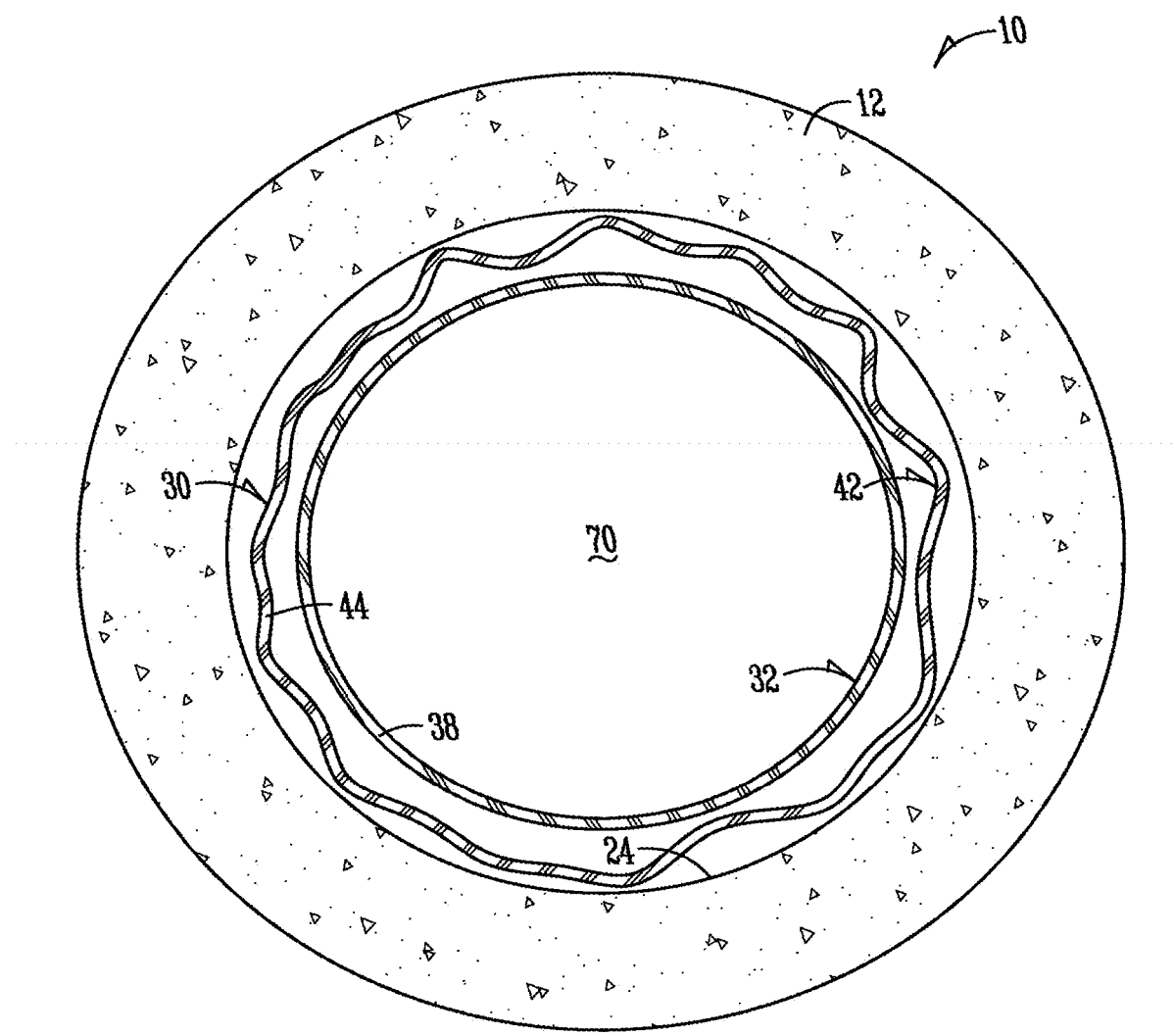
FIG. 3 is a sectional view of the pipe of FIG. 2 according to line 3-3 of FIG. 2.

FIG. 1 is a sectional view of an exemplary structure of a pipe 10. The pipe 10 has a plurality of inner diameters, including a first portion 12 having a first diameter D1, a second portion 16 adjacent the first portion 12 having a second diameter D2, and a third portion 18 having a third diameter D3. It should be understood that a variety of diameters and shapes of pipe may be present in a pipe to be rehabilitated. The choice of three pipe portions having various diameters is shown for illustrative purposes in this embodiment. It should also be noted that the methods of this invention may be applied to an entire length of pipe in a pipeline or to portions of a pipeline having a length of pipe to be repaired.

FIG. 2 is a sectional view of the liner assembly 30 of the present invention positioned in a pipe 10. The liner assembly 30 includes a bladder 32 and a pipe liner 42. The liner assembly 30 is associated with an inflation member 68 for expanding the walls of the pipe liner 42 against the wall of the pipe 10. The bladder 32 comprises a first end 34 attached to the inflation member 68 near a first end 28 of the pipe 10, a second end 36 positioned at the second end 58 of the pipe 10, and a bladder body 38 there between. The first end 34 of the bladder 32 may be attached to the inflation member 68 outside of the pipe 10 as well. The diameter 40 of the bladder 32 is less than or equal to the smallest diameter D1 of the pipe 10 before any stretching of the bladder 32 occurs. The bladder body 38 is stretchable such that it is able to press against a wall 24 of the pipe 10 when expanded. The pipe liner 42 is attached at the first end 28 of the pipe 10, and comprises a pipe liner body 44 that at least partially surrounds the bladder body 38 in the pipe 10.

The pipe liner body 44 is comprised of lining material substantially free of coating or intermediate layers of material impervious to the resinous material 48. The pipe liner 42 may also have a seamless construction. The resinous material 48 may be a thermoset resin, which saturates the liner and cures and hardens quicker in the presence of heat. However, it should be appreciated that other resinous materials may be used, on the condition that they are able to cure and harden. The pipe liner 42 is essentially a transport device, such that the resinous material 48 forms the structural properties of the liner when cured.

The diameter 46 of the pipe liner 42 (shown in FIG. 6) is substantially equal to the largest diameter D3 of the pipe 10. Therefore, the pipe liner 42 does not need to be stretchable. After the pipe liner 42 has been impregnated with a resinous material 48, the pipe liner 42 is positioned in the pipe 10 by pushing or pulling. Prior to, simultaneous with, or after the pipe liner 42 is inserted into the pipe 10, the bladder 32 is inserted into the pipe liner 42. Alternatively, the pipe liner 42 and bladder 32 may be inserted into the pipe 10 simultaneously using an inversion method. An inversion method includes journaling the pipe liner 42 within the bladder 32, and closing a first end of the liner assembly 30 using a rope, tape, tie, clamp, or the like. The pipe liner 42 may be impregnated with a resinous material before or after journaling within the bladder 32. The liner assembly 30 is then placed within an inversion vessel (not shown), and a second opposite end of the liner assembly 30 is attached to the inversion vessel. Fluid pressure is then applied to the inversion vessel, forcing the length of liner assembly out of the inversion vessel and against the walls of the pipe.

FIG. 3 is a top sectional view of the pipe 10 of FIG. 2 according to line 3-3 of FIG. 2. FIG. 3 shows the bladder 32 and the pipe liner 42 positioned in the pipe 10. As is seen in FIG. 3, the diameter of the bladder 32 is less than the diameter of the pipe liner 42. As is also shown in FIG. 3, the original diameter of the pipe liner 42 is substantially greater than the diameter D1 of the pipe 10 at the first portion 12. Because the diameter of the pipe liner 42 is greater than the diameter D1 of the first portion 12, the pipe liner will fold over itself and bunch up to fit within the first portion 12 and second portion 16 of the pipe 10.

Figure 4:
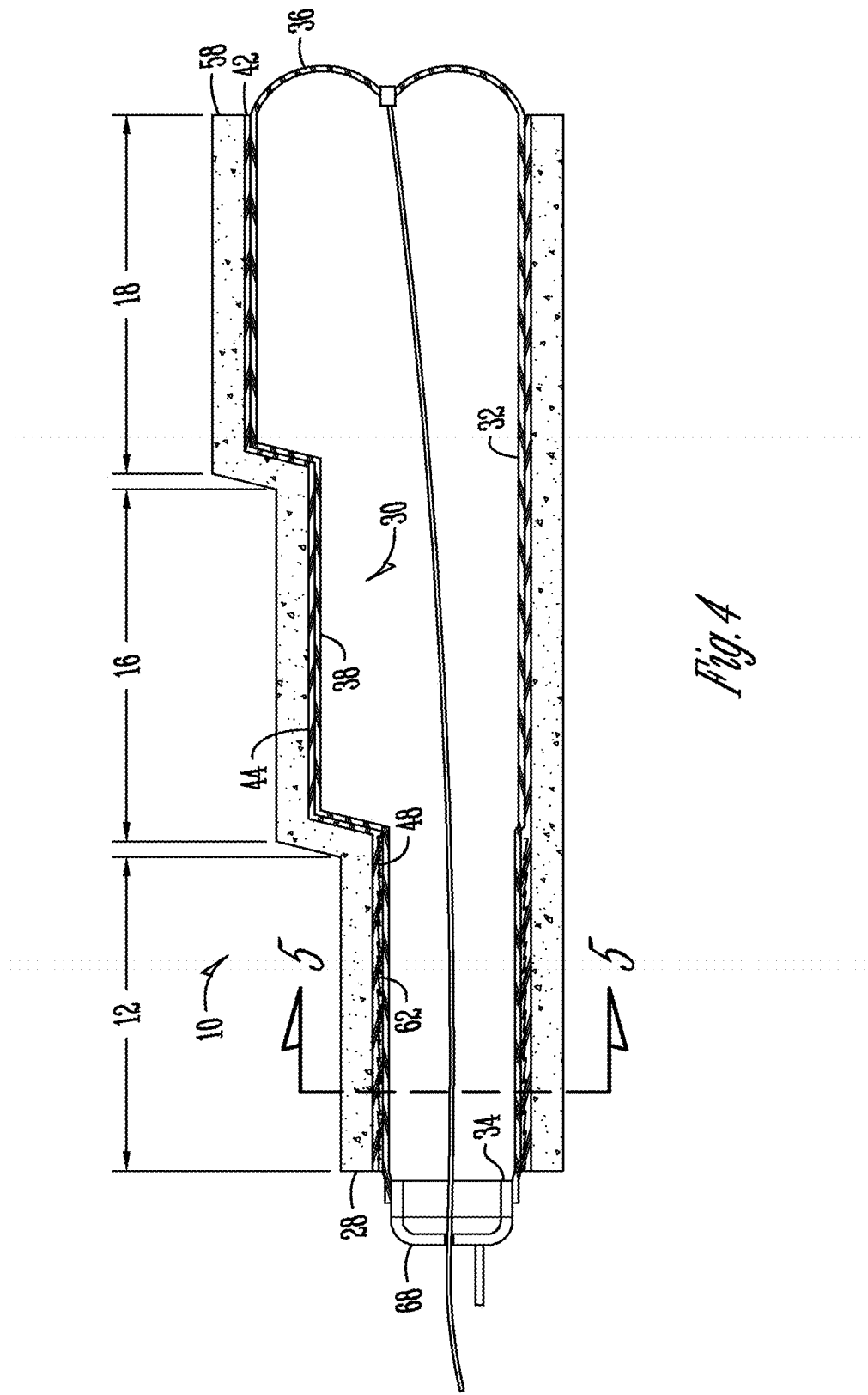
FIG. 4 is a view similar to FIG. 2 showing the bladder fully inflated in the pipe.

FIG. 4 is a sectional view similar to FIG. 2 showing bladder 32 fully inflated in the pipe 10. The bladder 32 is inflated with fluid pressure (not shown), such as air, introduced to the cavity 70 of the bladder body 38. The increased pressure causes the stretchable bladder body 38 to expand circumferentially towards the wall 24 of the pipe 10. The expanded bladder will press the pipe liner 42 against the wall 24 of the pipe 10. This will create a layer 62 of resinous material 48 between the pipe liner 42 and the bladder body 38. Because the bladder 32 has stretched circumferentially against the pipe liner 42, the bladder body 38 will have a smooth surface abutting the layer 62 of resinous material 48. This ensures that the resulting pipe wall 24 will be smooth and even.

Figure 5:
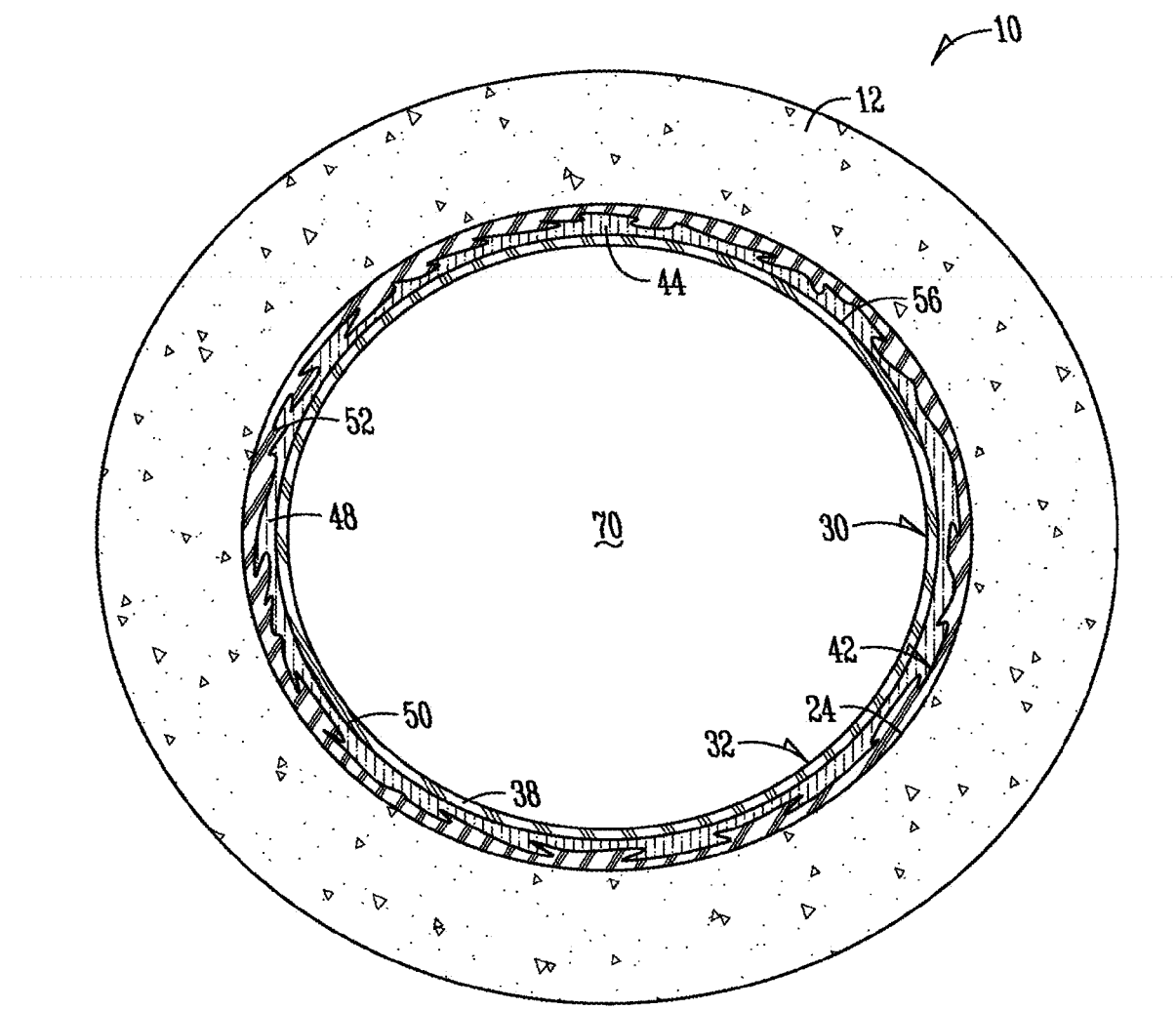
FIG. 5 is a sectional view according to line 5-5 of FIG. 4.

FIG. 5 shows a top sectional view of the pipe 10 of FIG. 4 according to the line 5-5 of FIG. 4. FIG. 5 is a sectional view of the pipe 10 near the first portion 12 of the pipe 10, where the diameter D1 of the pipe is substantially smaller than the diameter D3 of the third portion 18 of the pipe 10. Because the pipe liner 42 has been sized substantially equal to the diameter D3 of the larger section of the pipe 10, there will be excess pipe liner body 44 at this section of pipe. The excess pipe liner body 44 will fold over itself and bunch up to create folds 52 in the liner. However, because the pipe liner 42 does not contain a resin impermeable coating, the folds 52 will compress and resinous material 48 will form a pipe liner 42 in the same way as in the larger sections of pipe, where the pipe liner 42 is a single layer. The compression creates a layer 62 of resinous material 48 between the pipe liner 42 and the bladder 32. The thickness of the layer 62 of resinous material may vary according to the number of folds 52 or bunches in the pipe liner 42. Since the bladder 32 was stretched to press the pipe liner 42 against the wall 24 of the pipe 10, the bladder 32 will have a smooth surface 56 pressed against the varying layers of resinous material 48. This will result in the resinous material having a smooth interior surface. Because the folds 52 may contain two or more layers of pipe liner 42, the resinous material 48 will cure and harden to produce a thicker pipe wall 24 at the smaller sections of the pipe.

Figure 6:
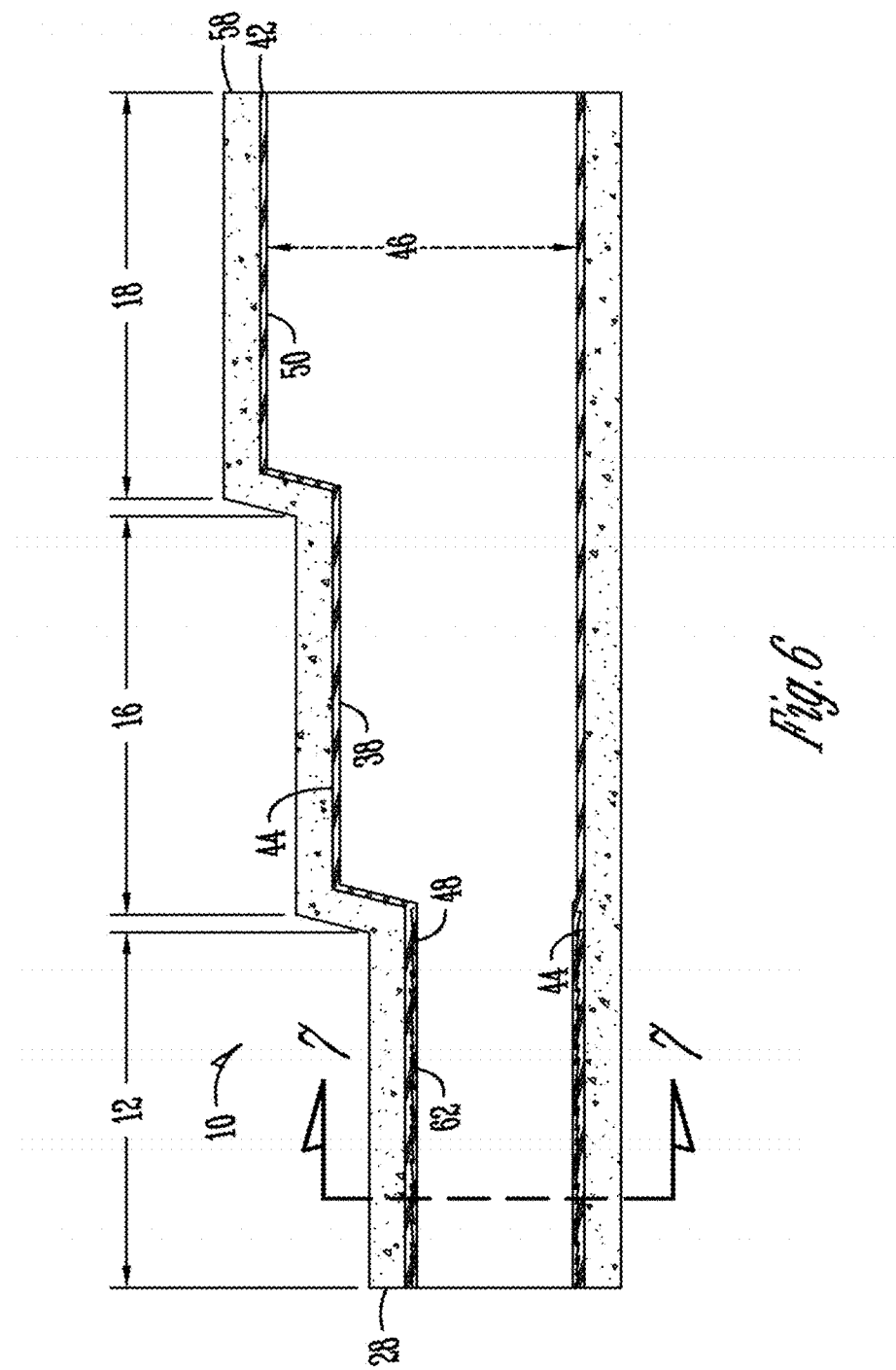
FIG. 6 is a sectional view of the repaired pipe after the bladder has been removed.

FIG. 6 is a sectional view of the pipe 10 after the resinous material 48 has cured and hardened and the bladder 32 has been removed from the pipe 10. The bladder 32 may be removed by deflating the fluid from the cavity 70, and then by pulling a rope (not shown) connected to the second end 36 of the bladder 32. Pulling the bladder 32 out first causes the bladder 32 to peel away from the cured resinous material 48. Although peeling the bladder 32 requires the least amount of effort, it should be appreciated that the bladder 32 may also be pulled straight out of the pipe 10 from the first end 34 of the bladder 32 as well. What remains is a pipe 10 having a renewed wall 24.

Alternatively, the bladder 32 may be left in the pipe, acting as a coating for the new lining of the pipe. In such an embodiment, the material chosen for the bladder 32 should be compatible for adhesion with the pipe liner 42 and/or the resinous material 48. If the materials are compatible for adhesion, the bladder will be very difficult if not impossible to peel from the cured resinous material. After the resinous material cures, the unused portions of bladder hanging within the pipe may be cut away by hand or using a remote cutting vehicle.

As is shown in FIG. 6, the pipe liner 42 has compressed the impregnated resinous material 48 from the pipe liner body 44, creating a cured resinous material layer 62 around the interior periphery of the pipe 10. As stated above, the layer 62 will be thicker in the first portion 12 of the pipe 10 because the pipe liner 42 will have folded over itself or bunched in areas. The folds 52 will occur in areas of the pipe 10 having a diameter less than the largest diameter D3 of the pipe 10.

Figure 7:
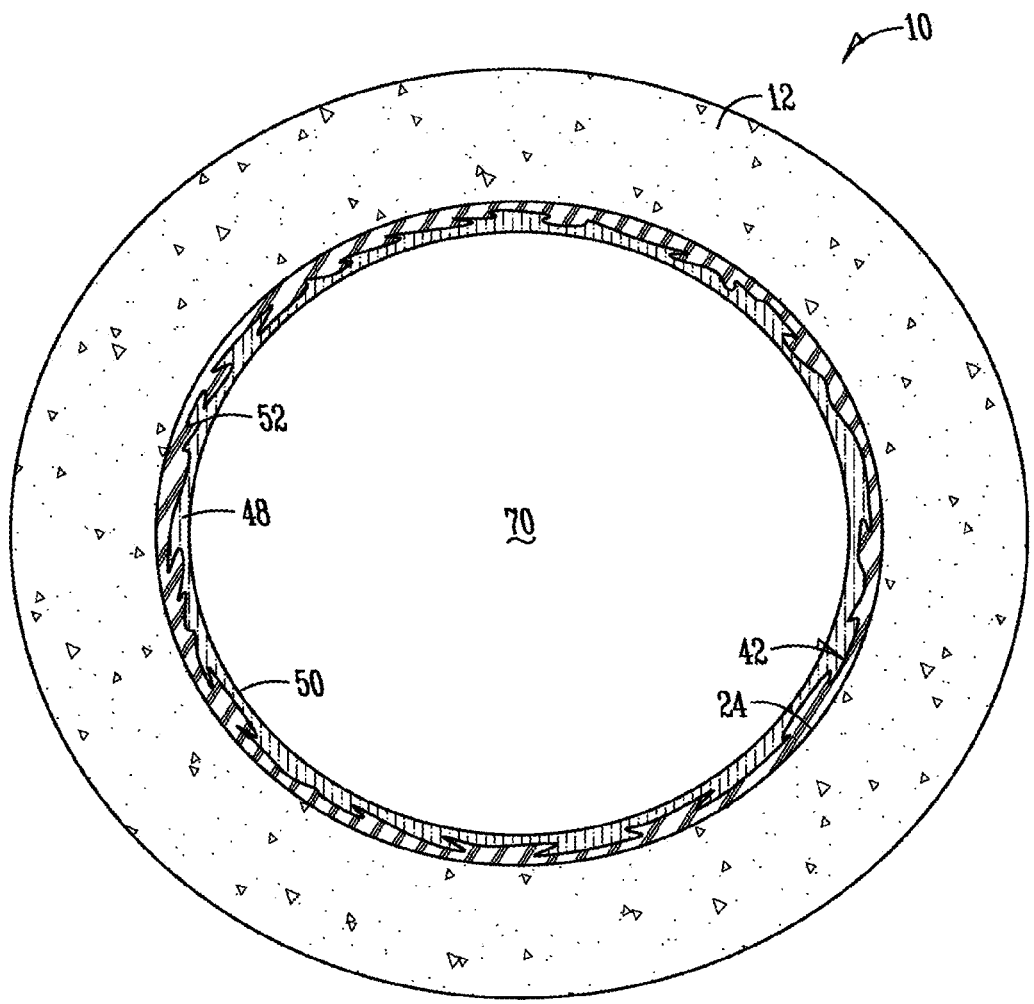
FIG. 7 is a sectional view according to line 7-7 of FIG. 6.

FIG. 7 is a top sectional view of the pipe 10 of FIG. 6 according to the line 7-7 of FIG. 6. FIG. 7 shows that although the pipe liner 42 folded over itself, the pipe liner 42 was compressed against the smooth outer surface 56 of the bladder 32, such that the interior periphery of the resinous material 48 cured into a smooth finish 50. At the smaller portions of the pipe, the folds 52 of the pipe liner 42 will cause the cured resinous layer 62 to be thicker than at the larger portions of the pipe 10. However, because the bladder 32 is pressed against the pipe liner 42 with even pressure, the layer 62 of resinous material 48 will be substantially equal along the length of the pipe 10, especially in embodiments where an inversion installation technique is used in the direction of larger pipe. The resinous material 48 will migrate from the bunched areas of liner by pressure toward the larger areas of the liner, to create a resinous surface that is smooth about the interior walls of the pipe 10. The smooth finish 50 of the cured resinous material 48 allows the pipe to be used as it had previously before it required repair.

The invention has been shown and described above with the several embodiments, and it is understood that many modifications, substitutions, and additions may be made which are within the intended spirit and scope of the invention. From the foregoing, it can be seen that the present invention accomplishes at least all of its stated objectives. The invention is only to be limited by claims appended hereto.

The invention claimed is:

1. A liner assembly for lining a pipe having varying diameters along a length of the pipe, comprising: a bladder having a first end, an opposite second end, and a bladder body there between, wherein the bladder body has a diameter smaller than or equal to a smallest diameter of the pipe; wherein the bladder body is capable of stretching circumferentially; a pipe liner having a pipe liner body along its length, the pipe liner body having a diameter larger than the smallest diameter of the pipe; and wherein the pipe liner is impregnated with a resinous material capable of curing and hardening to create a cured pipe liner; wherein the cured pipe liner includes areas having bunches and folds where the diameter of the pipe liner body is larger than the diameter of the pipe; wherein the resinous material forms a smooth inner surface of the cured pipe liner in areas having bunches and folds.

2. The liner assembly of claim 1 wherein the pipe liner is tubular shaped.

3. The liner assembly of claim 1 wherein the pipe liner is a seamless construction.

4. The liner assembly of claim 1 wherein the cured pipe liner produces a smooth inner surface in areas where the diameter of the pipe is less than the diameter of the pipe liner body.

5. The liner assembly of claim 1 wherein the diameter of the pipe liner body is substantially equal to a largest diameter of the pipe.

6. The liner assembly of claim 5 wherein the cured pipe liner does not have bunches and folds where the diameter of the pipe liner body is substantially equal to the diameter of the pipe.

7. The liner assembly of claim 1 wherein the pipe liner is not stretchable circumferentially.

8. The liner assembly of claim 1 wherein the pipe liner comprises a lining material substantially free of coating or intermediate layers of material impervious to the resinous material capable of curing and hardening.

9. The liner assembly of claim 8 wherein the cured pipe liner is thicker in the areas having bunches and folds compared to areas which do not have bunches and folds.

10. A liner assembly for lining a pipe having varying diameters along the length of the pipe, comprising: a bladder having a first end, an opposite second end, and a bladder body there between, wherein the bladder body has a diameter smaller than or equal to a smallest diameter of the pipe; wherein the bladder body is capable of stretching circumferentially; a pipe liner having a pipe liner body along its length, the pipe liner body having a diameter larger than the smallest diameter of the pipe; and wherein the pipe liner is impregnated with a resinous material capable of curing and hardening to create a cured pipe liner; and wherein the pipe liner is capable of folding on itself at a location of the pipe wherein the pipe liner has a diameter greater than the pipe such that the cured pipe liner will still produce a smooth finished repair surface; wherein the cured pipe liner includes areas having bunches and folds where the diameter of the pipe liner body is larger than the diameter of the pipe; wherein the resinous material forms a smooth inner surface of the cured pipe liner in areas having bunches and folds.

11. The liner assembly of claim 10 wherein the pipe liner is tubular shaped.

12. The liner assembly of claim 10 wherein the pipe liner is a seamless construction.

13. The liner assembly of claim 10 wherein the diameter of the pipe liner body is substantially equal to the largest diameter of the pipe.

14. The liner assembly of claim 13 wherein the cured pipe liner does not have bunches and folds where the diameter of the pipe liner body is substantially equal to the diameter of the pipe.

15. The liner assembly of claim 10 wherein the pipe liner is not stretchable circumferentially.

16. The liner assembly of claim 10 wherein the pipe liner comprises a lining material substantially free of coating or intermediate layers of material impervious to the resinous material capable of curing and hardening.

17. The liner assembly of claim 10 wherein the cured pipe liner is thicker in the areas having bunches and folds compared to areas which do not have bunches and folds.

18. A liner assembly for lining a pipe having a diameter, comprising:

a bladder having a first end, an opposite second end, and a bladder body there between, wherein the bladder body has a diameter smaller than or equal to the diameter of the pipe;

wherein the bladder body is capable of stretching circumferentially;

a pipe liner having a pipe liner body along its length, the pipe liner body having a diameter substantially equal to or greater than the diameter of the pipe;

wherein the pipe liner is impregnated with a resinous material capable of curing and hardening to create a cured pipe liner;

wherein the cured pipe liner includes areas having bunches and folds where the diameter of the pipe liner body is larger than the diameter of the pipe;

wherein the resinous material forms a smooth inner surface of the cured pipe liner in areas having bunches and folds.

* * * * *